US011188340B2

(12) United States Patent
Thompto et al.

(10) Patent No.: US 11,188,340 B2
(45) Date of Patent: Nov. 30, 2021

(54) MULTIPLE STREAMS EXECUTION FOR HARD-TO-PREDICT BRANCHES IN A MICROPROCESSOR

(71) Applicant: International Business Machines Corporation, Armonk, NY (US)

(72) Inventors: Brian W. Thompto, Austin, TX (US); Hung Q. Le, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 16/226,729

(22) Filed: Dec. 20, 2018

(65) Prior Publication Data
US 2020/0201646 A1 Jun. 25, 2020

(51) Int. Cl.
*G06F 9/38* (2018.01)

(52) U.S. Cl.
CPC .......... *G06F 9/3842* (2013.01); *G06F 9/3806* (2013.01); *G06F 9/3838* (2013.01); *G06F 9/3851* (2013.01)

(58) Field of Classification Search
CPC .... G06F 9/3806; G06F 9/3842; G06F 9/3851; G06F 9/3838
See application file for complete search history.

(56) References Cited

U.S. PATENT DOCUMENTS

| | | | | |
|---|---|---|---|---|
| 5,860,017 A | * | 1/1999 | Sharangpani | G06F 9/3804 712/218 |
| 5,944,816 A | * | 8/1999 | Dutton | G06F 9/3851 710/266 |
| 9,367,314 B2 | | 6/2016 | Grochowski et al. | |
| 2009/0063819 A1 | * | 3/2009 | Doing | G06F 9/3804 712/205 |
| 2010/0287358 A1 | | 11/2010 | Emma et al. | |
| 2014/0122836 A1 | * | 5/2014 | Gschwind | G06F 9/3017 712/205 |
| 2014/0201508 A1 | * | 7/2014 | Busaba | G06F 9/3851 712/239 |
| 2017/0024215 A1 | | 1/2017 | Okazaki et al. | |
| 2020/0026520 A1 | * | 1/2020 | Ward | G06F 9/3844 |

OTHER PUBLICATIONS

Ahuja et al, Multipath Execution: Opportunities and Limits, 1998, ACM, 0-89791-998-x/98/7, 8 pages (Year: 1998).*
Klauser et al, Selective Eager Execution on the PolyPath Architecture, Jul. 1, 1998, Proceedings 25th Annual International Symposium on Computer Architecture/IEEE, 10 pages (Year: 1998).*
Heil et al, Selective Dual Path Execution, Nov. 8, 1996, 29 pages, [retrieved from the internet on Mar. 20, 2020], retrieved from URL < jes.ece.wisc.edu/papers/sdpe.pdf> (Year: 1996).*

(Continued)

*Primary Examiner* — Jyoti Mehta
(74) *Attorney, Agent, or Firm* — Patterson + Sheridan, LLP

(57) ABSTRACT

Techniques for parallel execution of instructions in an instruction set are described. The techniques include determining a plurality of instruction streams and paths for a branch in an instruction set and executing the determined paths in parallel such that a mis-predicted path does not cause significant mis-prediction penalties.

17 Claims, 9 Drawing Sheets

(56) References Cited

OTHER PUBLICATIONS

Tyson et al, Limited Dual Path Execution, 1997, 14 pages, [retrieved from the internet on Mar. 19, 2020], retrieved from URL < www.eecs.umich.edu/techreports/cse/97/CSE-TR-346-97.pdf> (Year: 1997).*

Klauser, A. et al, "Dynamic Hammock Predication for Non-predicated Instruction Set Architectures," International Conference on Parallel Architectures and Compilation Techniques (PACT) 1998, 8 pages.

Kim, H. et al.; "Diverge-Merge Processor (DMP): Dynamic Predicated Execution Complex Control-Flow Graphs Based on Frequently Executed Paths," Department of Electrical and Computer Engineering The University of Texas at Austin, 2006, 12 pages.

Anonymously, "Apparatus for Interleaving Execution of Distinct Conditional Branches," Feb. 2, 2012. 3 pages.

IBM, "Branch Assist to Enhance Single Threaded Mode Execution in a Simultaneous Multithreaded (SMIT) Microprocessor," Jan. 3, 2007. 3 pages.

Anonymously: "Method and System for Verifying Microprocessor Branch Prediction Logic based on Preloaded Constrained Instruction Streams," Feb. 2, 2015 6 pages.

* cited by examiner

| Stream IEA | L0 Index |  |  |  |  |
|---|---|---|---|---|---|
| 311 |  |  |  |  |  |
| 321 |  |  |  |  |  |
| 322 |  |  |  |  |  |
| 332 |  |  |  |  |  |
| 312 |  |  |  |  |  |

402 — Stream IEA column; 404 — L0 Index; 408 — rows bracket

| Path | Stream Mask | So Link | DV | ... | DV | Sn-1 Link | DV |
|---|---|---|---|---|---|---|---|
| 303 | 10110 | SIT 311 | 1 | SIT 322 | 1 |  | 1 |
| 302 | 00001 | SIT 312 | 1 | SIT 321 | 1 | SIT 332 |  |
| 304 | 11000 | SIT 311 | 1 |  |  |  |  |
| Pn |  |  |  |  |  |  |  |

452 — Path; 453 — Stream Mask; 454 — So Link; 456 — DV; 458 — ...; 460 — DV; 462 — Sn-1 Link; 464 — DV; 470 — rows bracket

| Dispatch Paths | Instruction and Architected Register | Stream Mask | Destination Logical Register | Source Logical Mask/Register | Physical Mask/Register | Issued Insn |
|---|---|---|---|---|---|---|
| 303 - SIT 311 | A 1,2,3 | 10000 | R1 | 00000 R2, 00000 R3 | 10000 R1 = 41 | A 41,2,3 |
| 303 - SIT 311 | A 4,1,5 | 10000 | R4 | 10000 R1, 00000 R5 | 10000 R4 = 44 | A 44,41,5 |
| 303 - SIT 311 | A 6,7,8 | 10000 | R6 | 00000 R7, 00000 R8 | 10000 R6 = 46 | A 46,7,8 |
| 302 - SIT 311 | S 1,2,3 | 00001 | R1 | 00000 R2, 00000 R3 | 00001 R1 = 51 | S 51,2,3 |
| 302 - SIT 312 | S 4,1,5 | 00001 | R4 | 00001 R1, 00000 R5 | 00001 R4 = 54 | **S 54,51,5 *** |
| 302 - SIT 312 | S 7,7,8 | 00001 | R7 | 00000 R7, 00000 R8 | 00001 R7 = 57 | S 57,7,8 |
| 302 - SIT 312 | M 1,2,3 | 00001 | R1 | 00000 R2, 00000 R3 | 00001 R1 = 61 | M 61,2,3 |
| 302 - SIT 312 | M 11,1,5 | 00001 | R11 | 00001 R1, 00000 R5 | 00001 R11 = 91 | **M 91,51,5 *** |
| 302 - SIT 312 | M 6,7 | 00001 | R6 | 00001 R7 | 00001 R6 = 66 | M 66,7 |
| 302 - SIT 312 | M 7,7 | 00001 | R7 | 00001 R7 | 00001 R7 = 67 | M 66,7 |
| 302 - SIT 312 | M12,12,10 | 10100 | R12 | 00000 R12, 00000 R10 | 00001 R12 = 92 | M 92,12,10 |
| 303 - SIT 322 | S 1,1,3 | 10100 | R1 | 10000 R1, 00000 R3 | 10100 R1 = 71 | **S 71,41,3 *** |
| 303 - SIT 322 | S 11,7,8 | 10100 | R11 | 00000 R7, 00000 R8 | 00100 R11 = 101 | S 101,7,8 |
| 303 - SIT 332 | M 1,2,3 | 10110 | R1 | 00000 R2, 00000 R3 | 10110 R1 = 81 | M 81,2,3 |
| 303 - SIT 332 | M 11,1,5 | 10110 | R11 | 10100 R1, 00000 R5 | 10110 R11 = 111 | **M 111,81,5 *** |
| 303 - SIT 332 | M 6,7 | 10110 | R6 | 00000 R7 | 10110 R6 = 76 | M 76,7 |
| 303 - SIT 332 | M 7,7 | 10110 | R7 | 10110 R7 | 10110 R7 = 77 | M 77,7 |
| 303 - SIT 332 | M12,12,10 | 10110 | R12 | 00000 R12, 00000 R10 | 10110 R12 = 112 | M 112,12,10 |
| 304 - SIT 321 | A 1,1,3 | 11000 | R1 | 10000 R1, 00000 R3 | 11000 R1 = 121 | **A 121,41,3 *** |
| 304 - SIT 321 | A 11,7,8 | 11000 | R11 | 00000 R7, 00000 R8 | 11000 R11 = 131 | A 131,7,8 |

FIG. 5A

MULTIPLE STREAMS EXECUTION FOR HARD-TO-PREDICT BRANCHES IN A MICROPROCESSOR

The present disclosure relates to efficient execution and prediction of instructions in a microprocessor, and more specifically, to executing multiple predictions paths in parallel in order to quickly predict hard to predict branches in an instruction set.

In a typical microprocessor design, instructions after a predicted-taken branch in the instruction set are fetched and executed in order, according to the predicted taken branch. Instructions in the non-taken path are usually discarded from the fetch path. When the branch is mis-predicted or wrongly predicted, the instructions after the mis-predicted branch are flushed, and the fetch is re-directed to the correct branch path, which requires backtracking in the execution of the instruction set and inefficient resource usage.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example embodiment includes a method. The method includes during an execution of an instruction set, predicting, one or more instruction branches for the instruction set, determining an instruction branch of the one or more instruction branches is a hard to predict branch, and determining a plurality of instruction sets for the hard to predict branch. The method also includes determining a plurality of prediction paths for the determined plurality of instruction sets and executing, in parallel, the plurality of prediction paths for the hard to predict branch. Other embodiments of this aspect include corresponding computer systems, apparatus, and computer programs recorded on one or more computer storage devices, each configured to perform the actions of the methods.

Another example embodiment includes a system including: one or more computer processors, and a memory containing a program which when executed by the processors performs an operation. The operation includes during an execution of an instruction set, predicting, one or more instruction branches for the instruction set; determining an instruction branch of the one or more instruction branches is a hard to predict branch, and determining a plurality of instruction sets for the hard to predict branch. The operation also includes determining a plurality of prediction paths for the determined plurality of instruction sets and executing, in parallel, the plurality of prediction paths for the hard to predict branch.

Another example embodiment includes a computer program product including: a computer-readable storage medium having computer-readable program code embodied therewith, the computer-readable program code executable by one or more computer processors to perform an operation. The operation includes during an execution of an instruction set, predicting, one or more instruction branches for the instruction set, determining an instruction branch of the one or more instruction branches is a hard to predict branch, and determining a plurality of instruction sets for the hard to predict branch. The operation also includes determining a plurality of prediction paths for the determined plurality of instruction sets and executing, in parallel, the plurality of prediction paths for the hard to predict branch.

BRIEF DESCRIPTION OF THE SEVERAL VIEWS OF THE DRAWINGS

FIG. 4A is a stream information table for the plurality of prediction paths depicted in FIG. 3, according to one embodiment described herein.

FIG. 4B is a path information table for the plurality of streams depicted in FIG. 3, according to one embodiment described herein.

FIGS. 5A-C illustrate example dispatch outcomes for a plurality of paths, according to one embodiment described herein.

DETAILED DESCRIPTION

As described above, when a branch in an instruction set is mis-predicted, the execution of the instruction set must backtrack to the branch and re-fetch and re-execute the non-taken branch path. As described herein, a branch in the instruction set occurs when there are two or more possible instructions to be executed next in the instruction set. As also described herein, a stream is a collection of sequential instructions which may include (predicted) taken branches and a branch stream ("stream") is a group of sequential instructions that may be executed from the two or more possible instructions from the branch. A path is a collection of streams, where instructions in the path are dispatched in order. The systems and methods described herein include a process to fetch and execute a branch's predicted non-taken path at the same time with the instructions from the predicted taken path. In one example, when the branch is mis-predicted, the instructions from the mis-predicted branch path are flushed, but the instructions from the non-taken path are already in the pipe/cache for execution. As such, these systems and methods reduce branch mis-prediction penalties significantly and improves performance of the microprocessor.

Figure 1:
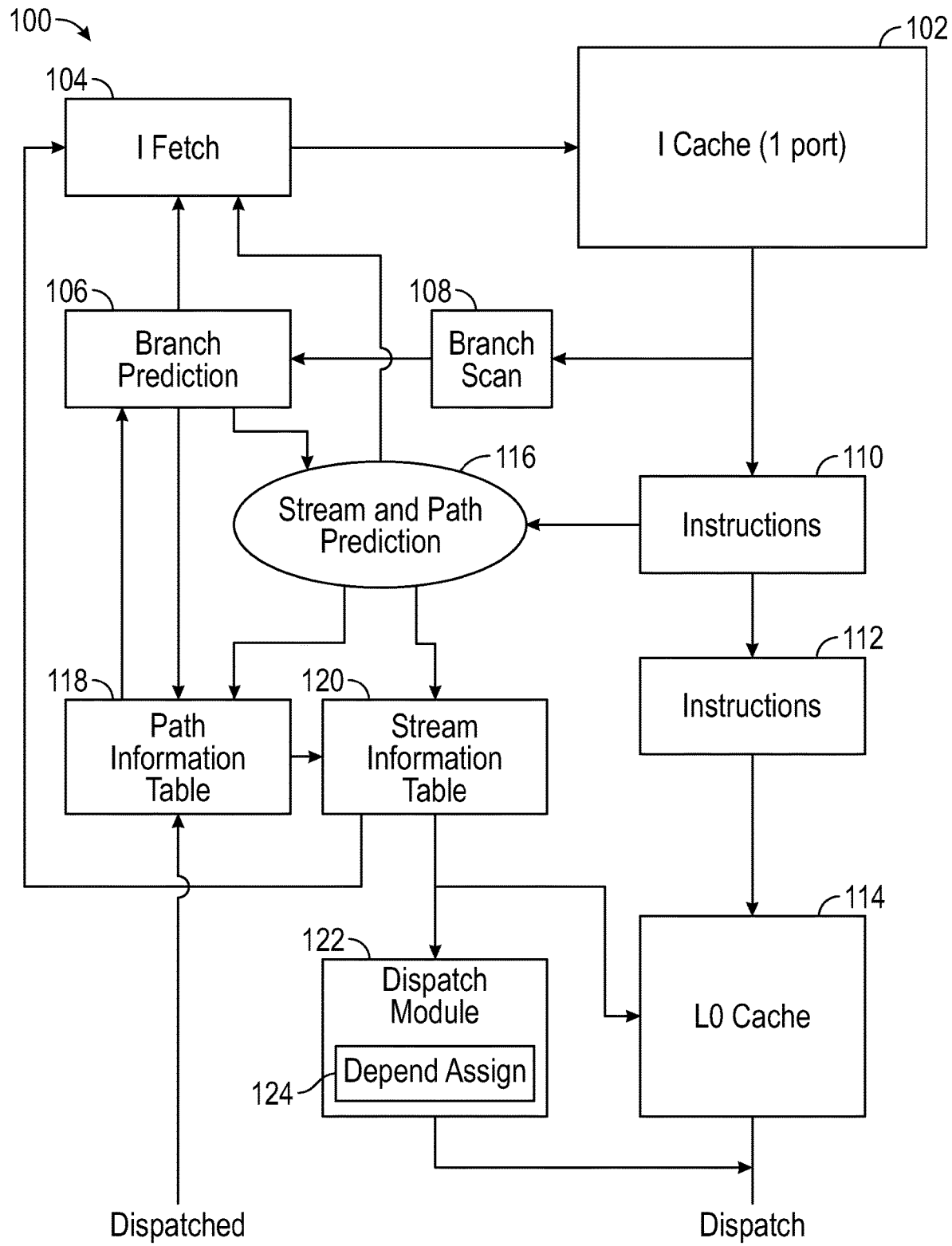
FIG. 1 is a system flow diagram, according to one embodiment described herein.

FIG. 1 is a system flow diagram, according to one embodiment described herein. As shown, FIG. 1 illustrates system 100 which includes a branch prediction module 106, an instruction fetch module 104, an instruction cache 102, and a branch scan module 108. As an instruction set is executing, the branch scan module 108 detects any branches in the instruction set. The branch prediction module also predicts a correct branch for execution and the instruction fetch module 104 fetches the instructions for execution from the instruction cache 102. When the branch prediction module 106 determines that a branch of the instructions is a hard to predict branch (e.g., likely to be mis-predicted, etc.) the branch prediction module begins to fetch and execute both streams of the instruction set. For example, the branch prediction module may instruct the fetch module to fetch instructions for a branch based on the branch confidence. In some examples, for a first confidence score indicating the branch is easy to predict, the branch prediction module 106 and fetch module 104 pre-fetches instructions for one of the plurality of prediction paths of a branch, this allows the system 100 to be ready to fetch and execute an unselected path if the selected path is mis-predicted, without having to utilize resources for parallel execution. In another example, for a second confidence score indicating the branch is occasionally mis-predicted, the branch prediction module 106 and fetch module 104 fetches instructions and stores instructions for one of the plurality of prediction paths this allows the system 100 to execute an unselected path if the selected path is mis-predicted, again without having to utilize resources for parallel execution. In another example, for a third confidence score indicating the branch is a hard to predict branch, the branch prediction module 106 and fetch module 104 fetch and execute instructions for one or more of the plurality of prediction paths. This allows the system 100 to leverage bandwidth in an instruction buffer or L0 register (L0 Cache 114) to execute the hard to predict branches in parallel and thus reduce the cost of a mis-prediction in the branch.

The instructions module 110 and 112, along with the stream and path prediction module 116, build streams and paths from the branches of the instructions stream. For example, the stream and path prediction module 116 with the branch prediction module 106 identifies and sorts the possible streams and paths for one or more hard to predict branches and updates a path information table 118 and a stream information table 120 with the path information. The instruction fetch module 104 may also fetch among multiple streams identified in the stream information table 120 under a priority policy. In some examples, the priority policy may be based on the confidence associated with a stream as assigned by the branch prediction module 106 or the stream and path prediction module 116.

Figure 2A:
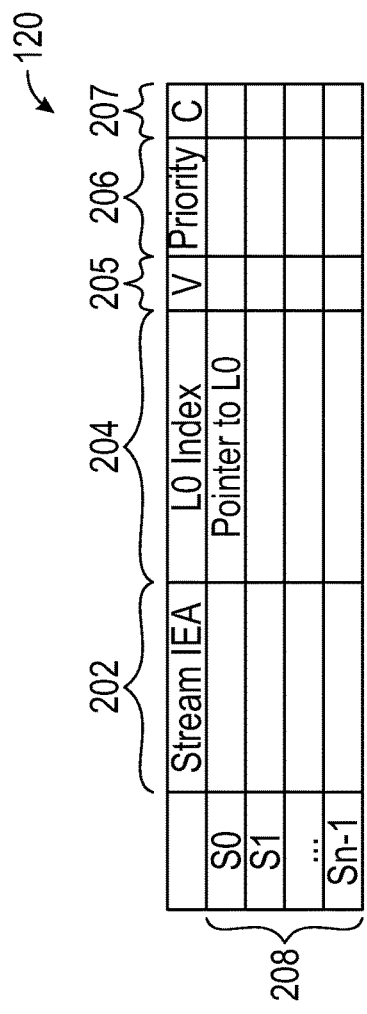
FIG. 2A illustrates a stream information table, according to one embodiment described herein.

For example, as shown in FIG. 2A, the stream information table 120 includes a listing of streams as shown in column 202, including the instruction effective address (IEA) for the stream indicating the next instruction address from which to fetch and a pointer to the instructions for the stream when stored in an L0 cache 114 as shown in column 204. Each entry in the stream information table also includes a valid bit (V) shown in column 205, indicating the stream is valid and active, a priority indication shown in column 206, and a completed bit (C) shown in column 207 indicating the stream has been completely fetched as detected by the stream and path prediction module 116 upon encountering the beginning of a new stream. The rows 208 of the stream information table 120 shows a stream for each row for an "n" number of streams in the instruction set.

Figure 2B:
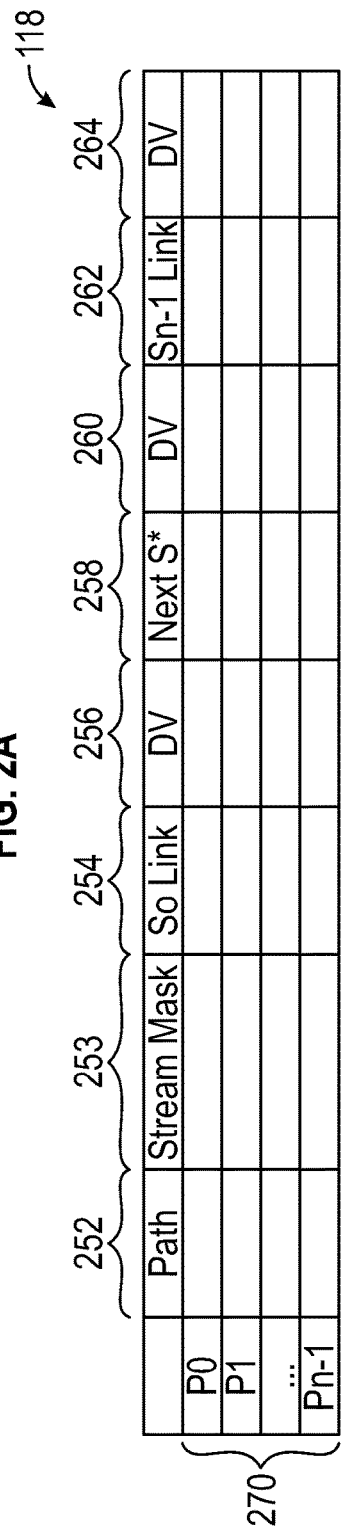
FIG. 2B illustrates a stream information table a path information table, according to one embodiment described herein.

FIG. 2B illustrates an example path information table 118, which includes another "n" number of paths as shown in rows 270. For each path, such as P0, the path information table 218 includes a path identification as shown in column 252, a stream link, such as a pointer, to the first stream in the path, such as stored in the stream information table 120. The path information table 118 also includes a stream mask 253 which indicates which of the stream information table entries constitute the path. The path information table 118 also includes a dispatch value (DV), such as shown in column 256 for the stream in the column 254 to indicate when a particular stream has already dispatched. The path information table also includes a stream link and DV value for each next subsequent stream in the path, such as shown in columns 258-264, this information enables sharing of stream segments from the L0 cache 114 between different paths when the paths re-converge to minimize fetch bandwidth and the total number of L0 cache entries consumed. In one embodiment, each entry in the path information table corresponds to a single stream entry in the stream information table such that no stream link information is needed and the contents for each row of the two tables may be addressed by a single index number. In this embodiment, path segments are uniquely identified by an associated stream mask, no separate path tracking is required, and a single DV bit indicates when the path segment has been dispatched.

Figure 2C:
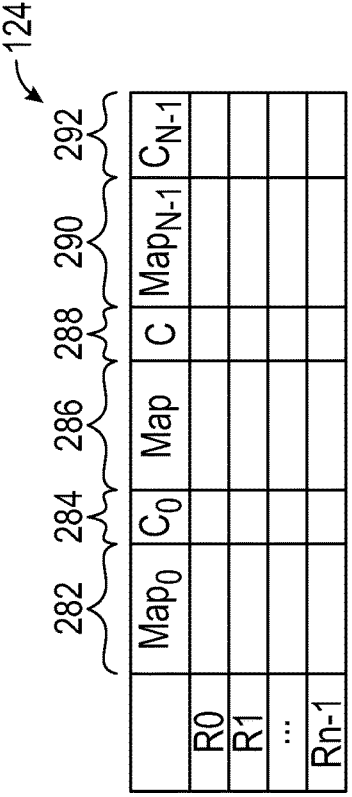
FIG. 2C illustrates an instruction dependency assignment table, according to one embodiment described herein.

FIG. 2C illustrates an example instruction dependency assignment, such as dependency assignment table 124, which is a component of the dispatch module 122. In some examples, the dispatch module 122 uses the dependency assignment table 124 to track architectural resources such as registers between producer and consumer instructions via mechanisms such as register renaming. For example, a single path of execution is supported by a mapping pointer (Map0) for each resource, shown in column 282, and a corresponding indication if the Map0 resource is non-speculative (C0), shown in column 284. As also shown, the dependency assignment table 124 supports tracking of multiple paths for concurrent execution. In some examples, the dispatch module 122 adds columns (e.g., columns 286-292) for each additional execution path. For example, a single path that encounters a single hard to predict branch and subsequently branches down two target paths, requires a total of three sets of resource mapping columns (e.g., a set including a Map0 column and a Co column), one for the original stream for the single path and two for each of the newly spawned streams. In some examples, the number of concurrent execution paths may include the total number of paths supported by the stream information table 120. In another example, the number of concurrent execution paths may include a smaller number of paths supporting a subset of fetched paths for concurrent execution. In the case of a smaller number of supported execution paths a mapping between resource columns and a subset of streams may be needed to track the dispatched paths in the dependency assignment table 124.

Referring back to FIG. 1, the instructions modules 110 and 112 also store the fetched instructions into the L0 cache 114. The system 100 also includes the dispatch module 122 and the L0 cache 114 where the dispatch module 122 and the L0 cache 114 are utilized to dispatch the instructions in a selected stream/path for execution by the processing resources of the microprocessor. In some examples, the instructions are dispatched in an out of order (OoO) manner as described herein.

Figure 3:
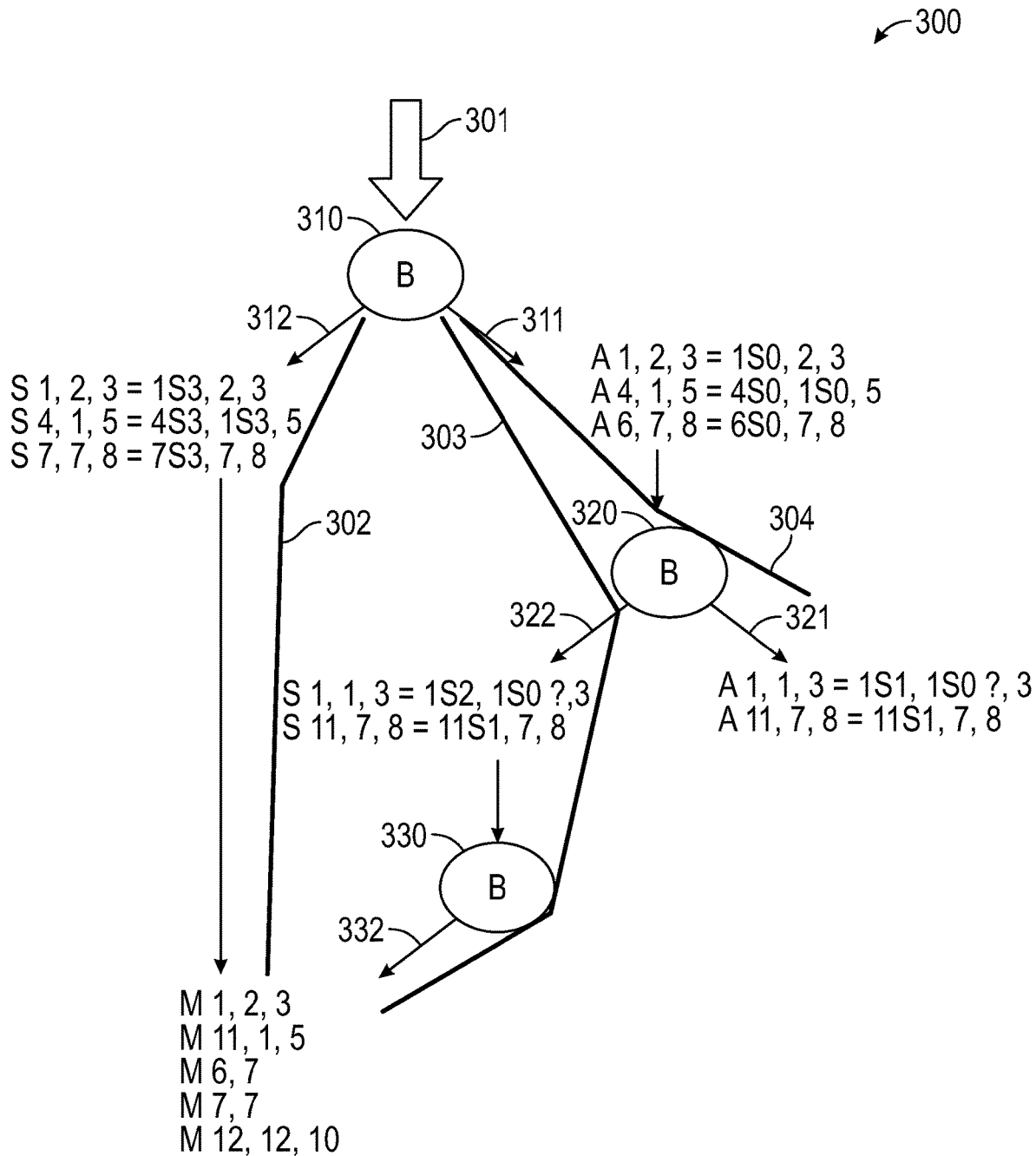
FIG. 3 depicts a plurality of branches, streams, and paths in an instruction set, according to one embodiment described herein.

FIG. 3 depicts a plurality of branches, streams, and paths in an instruction set, according to one embodiment. For example, as instruction set 301 is executing it reaches branch 310. In some examples, the branch prediction module 106 determines that the branch 310 is a hard to predict branch and begins fetching and executing instructions for a plurality of prediction paths. For example, the stream and path prediction module 116 determines a plurality of instruction sets for the hard to predict branch and determines a plurality of prediction paths for the determined plurality of instruction sets. As shown, the streams include streams 312, 311, 322, 321, and 332. In one example, for full execution of the streams, each of the streams 311, 312, 321, 322, and 332 are stored in the stream information table 120, are fetched by the instruction fetch module 104, and are stored in the L0 cache 114. In another example, such as speculative fetching into the L0 cache 114, the instructions for each of the streams 311, 312, 321, 322, and 332 are stored into and remain in the L0 cache 114 until a branch resolution.

In one example, as the stream and path prediction module 116 is building the stream and path possibilities, the branch prediction module 106 determines that the stream 311 includes a branch 320 and the stream 322 includes a branch 330. In some examples, the branch 320 is determined to be occasionally mis-predicted (e.g., has a second confidence score). In this example, the system 100 fetches instructions and store instructions for the stream 312 into the L0 cache 114. In some examples, the fetching is accomplished by allocating a new entry in the stream information table 120. In another example, the branch 330 is determined to be easily predicted such that instructions for an alternative stream (not shown) are only pre-fetched, for example pre-fetched/stored into the instruction cache 102. In an alternative example, no new stream is allocated for branch 330 and predicted path 332 is considered as part of stream 322 as a result of the branch being predicted with high confidence and/or because there are no entries available in the stream information table 120.

As shown, the stream and path prediction module 116 collect the possible streams into the paths 302, 303, and 304. As shown, the path 302 includes the stream 312 and the path 303 includes the streams 311, 322, and 332. Additionally, the path 304 includes the streams 311 and 321. The dispatch module 122 executes the paths, such as paths 302 and 303 in parallel. In another example, such as if branch 320 is a hard to predict path, the stream and path prediction module 116 determines streams and paths for the hard to predict branch 320 and also execute the paths from the subsequent hard to predict branch in parallel.

FIG. 4A is a stream information table 400 for the plurality of branches depicted in FIG. 3, according to one embodiment described herein. As shown, the rows 408 includes the streams depicted in FIG. 3, including streams 311, 312, 321, 322, and 332 (as shown in column 402). Each of the streams has an associated L0 index in column 404, such as a pointer to the fetched instructions in the L0 cache 114. The L0 index is assigned by the stream and path prediction module 116 when an entry point to the L0 cache 114 is allocated for storing the fetched instructions for the stream. In some examples, the L0 cache 114 manages how instructions from the stream are subsequently stored for a particular stream within the structure of the L0 cache.

FIG. 4B is a path information table 450 for the plurality of streams depicted in FIG. 3 and FIG. 4A and shown with all streams fetched and dispatched as indicated in columns 456, 460, and 464. For example, the rows 470 include the paths 303, 302, and 304 shown in column 452. For the path 303, the column 453 contains the stream mask which holds a bit-mask, with each bit corresponding with each row of the stream information table 400 and indicating the streams which comprise the path 303 as it is currently dispatched. As also shown in FIG. 4B, streams 311, 322, and 332, corresponded to indexes 0, 2, and 3 respectively, which, in turn, correspond to a bit mask of "0b10110." For the path 303, the columns 454, 458, and 462 include stream links, such as a pointer to the streams of the path in the stream information table 400 such as streams 311, 322, and 332. The path 302 includes the stream link to stream 312 and the path 304 includes the stream links to stream 311 and 321.

FIG. 5A illustrates an example dispatch for a plurality of paths, according to one embodiment described herein. As shown FIG. 5A includes the dispatch listing 500 where the paths and instructions are dispatched in order. The stream mask associated with each dispatched instruction is shown associated with instruction and destination resource assignment (destination logical resource). For each source register, a producer stream mask is shown along with the logical register number (stream mask/destination logical register). In one example, a unique stream mask is associated with a unique stream information table index, where the index is used to access unique columns of the dependency assignment table 124. For example, path 303 is dispatched such that stream 311 is executed and during the execution time the stream mask reflects only stream 311 (index 0). The path 303 is then followed by path 302 such that the paths, including the path 303, 302, and 304 are executed in parallel. In one example, as path 303 resumes dispatch after path 302, the stream mask assigned changes to include stream 322 (index 2) such that the stream mask indicates both index 0 and index 2, and subsequently also includes stream 332 at index 3. For each target resource (register) assigned, the dependency assignment table 124 column corresponding to the stream mask is updated to reflect the newly assigned resource. Thus each path of execution tracks its dependency chains independently by accessing the appropriate column of the dependency assignment table 124. In some examples, the contents of the dependency assignment table 124 columns corresponding to a current stream are copied to columns associated with a next stream in the sequence.

Figure 5B:

FIG. 5B illustrates an example dispatch for a plurality of paths, according to one embodiment described herein. As shown FIG. 5B includes the dispatch table 550 where the paths are dispatched OoO and instructions are dispatched in order. For example, path 303 is dispatched such that stream 311 is executed, then path 302 is dispatched such that stream 312 and executed. Like dispatch table 550, the paths 303, 302, and 304 are executed in parallel.

Figure 5C:

FIG. 5C illustrates an example flushed dispatch for a plurality of paths, according to one embodiment described herein. In some examples, the dispatch module 122 and instruction pipelines perform a flush to remove and/or deallocate flushed resources associated with instructions along either an incorrectly predicted path or along a path segment flushed for another reason. For example, after the path 303 is determined to be the correctly predicted path, the information related to the other paths in table 550 is flushed, as shown in FIG. 5C. In some examples, the flushing of instructions in the pipeline and the dependency assignment table 124 is facilitated by the use of the stream mask associated with each instruction or allocation. If the stream identification (stream-id) associated with the flushed stream is indicated in the stream mask of the candidate instruction or resource it qualifies for flush. In some examples, the flush determination includes a logical OR reduction of the mask bits after a logical bit-wise AND between the flush stream encoded as a mask, and the stream mask associated with each instruction or resource. This method allows for traditional mechanisms for tracking instructions within the pipeline to be retained while supporting a sparse flushing of instructions despite an interleaved OoO dispatch order of different paths. In one example shown in FIG. 5C, the branch 310 generates a flush of stream 312 with an associated flush mask of "0b00001" and the branch 320 generates a flush of stream 321 with an associated flush mask of "0b01000" and thus all instructions and resource allocations matching either of these masks as shown by any "1" value remaining after a bit-wise AND function with the stream mask are flushed.

Figure 6:
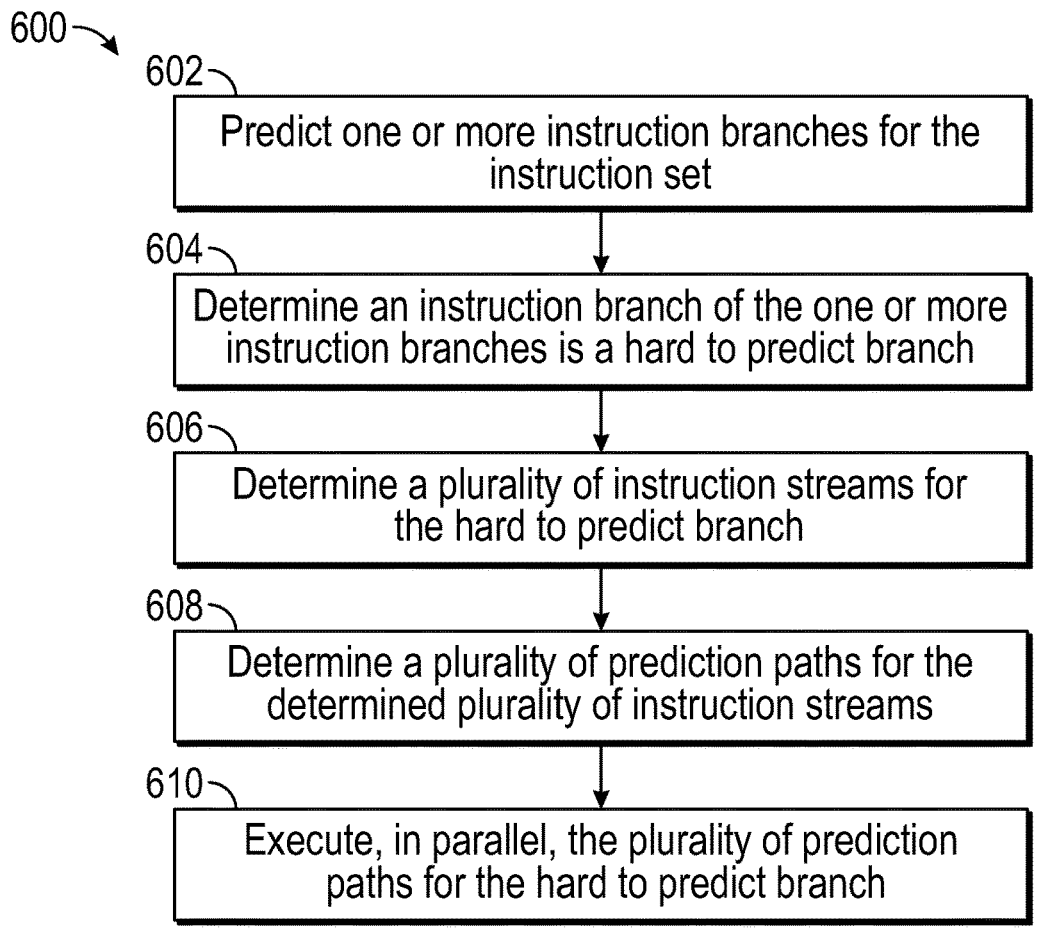
FIG. 6 is method for instruction prediction, according to one embodiment described herein.

FIG. 6 is a method for instruction prediction, according to one embodiment described herein. As shown, method 600 begins at block 602 where the system 100 predicts, one or more instruction branches for an instruction set. For example, during the execution of instruction set 300 the system 100 predicts one or more branches, such as branch(es) 310, 320, and 330 shown in FIG. 3.

At block 604, the system 100 determines an instruction branch of the one or more instruction branches is a hard to predict branch. For example, the branch prediction module 106 determines that the branch 310 is a hard to predict branch and begins executing paths in parallel.

At blocks 606 and 608, the system 100 determines a plurality of instruction streams for the hard to predict branch and determines a plurality of prediction paths for the determined plurality of instruction streams. For example, as shown in FIG. 3, the system 100, including the stream and path prediction module 116 determines the streams 311, 312, 322, 321, and 332 and determines the paths 302, 303, and 304 by sorting the determined streams into paths.

At block 610, the system 100 executes, in parallel, the plurality of prediction paths for the hard to predict branch. For example, the dispatch module 122 dispatches the instructions for the paths to the processing resources of the system 100. The dispatch module allows for the parallel execution of the paths by dispatching instructions from each determined path, such as shown in FIGS. 5A and 5B.

Figure 7:
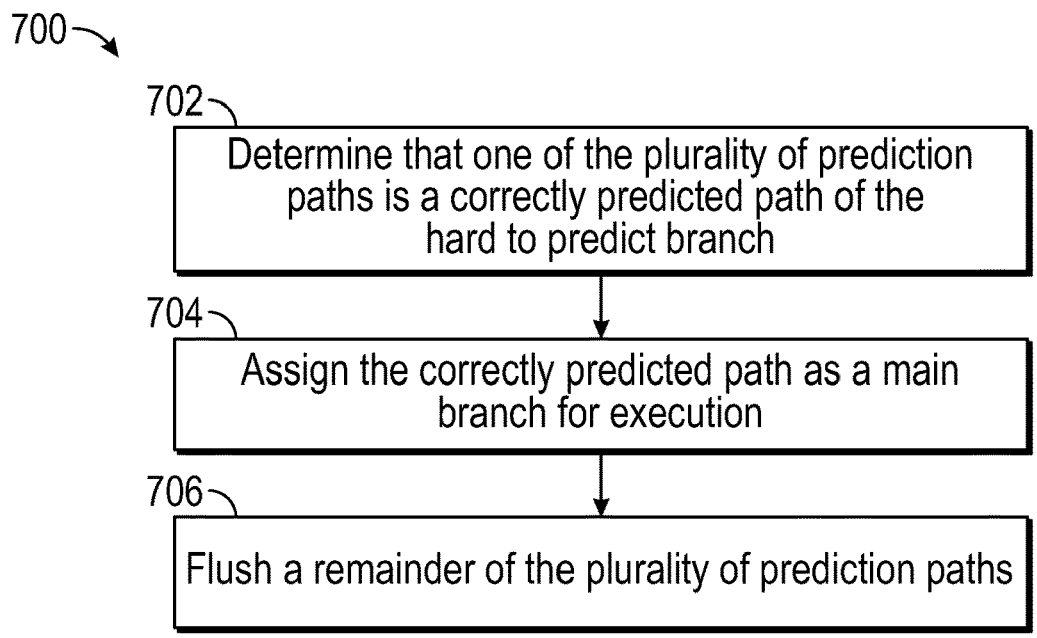
FIG. 7 is method for instruction prediction, according to one embodiment described herein.

FIG. 7 is method for instruction prediction, according to one embodiment described herein. Method 700 begins at block 702 where the system 100 determines that one of the plurality of prediction paths is a correctly predicted path of the hard to predict branch.

At block 704, the system 100 assigns the correctly predicted path as a main branch for execution. For example, as shown in FIGS. 3 and 5C, the path 303 is assigned as the main path for the instruction set 301. At block 708, the system flushes a remainder of the plurality of prediction paths as shown in FIG. 5C. In some examples, if the correctly predicted path is not dispatched speculatively, but is fetched into the L0 cache 114, then the dispatch module 122 looks up the L0 cache index from the stream information table 120 in order to directly fetch from the L0 cache 114 upon branch resolution. In some examples, when the branch is executed, branch resolution logic determines whether the branch was correctly predicted or not based on the actual information at execution time of the branch.

Figure 8:
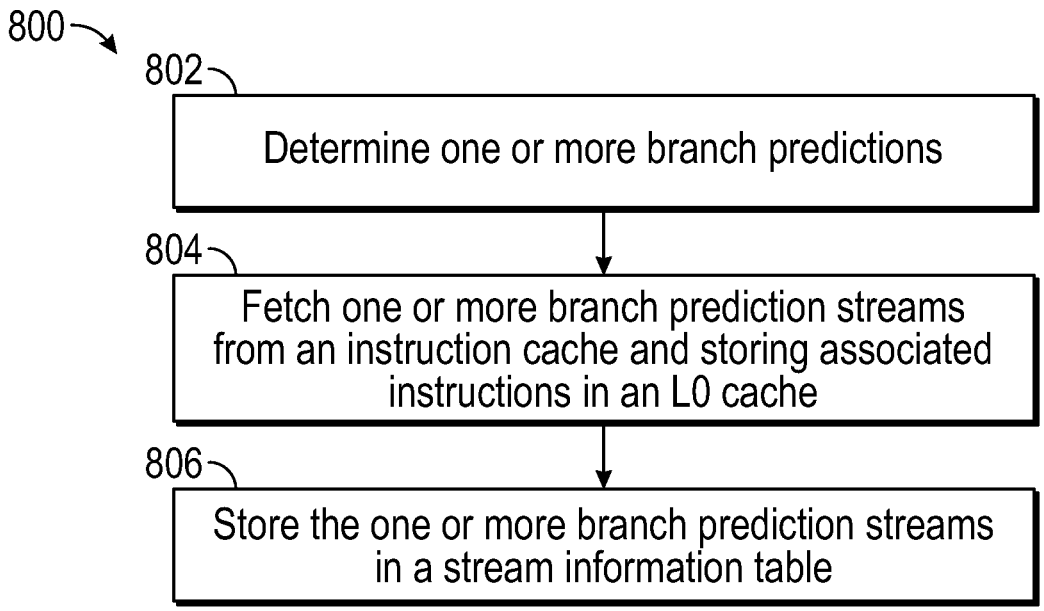
FIG. 8 is method for determining a plurality of instruction sets, according to one embodiment described herein.

FIG. 8 is method for determining a plurality of instruction sets, according to one embodiment described herein. Method 800 begins at block 802 where the system 100 determines one or more branch predictions. In some examples, branch scan module 108 in FIG. 1, examines (i.e. scans) the instructions from the instruction cache 102. When the module 108 detects that a branch instruction is in a current fetch group, the module 108 forwards the branch instruction to the branch Prediction module 106.

At block 804, the system 100 fetches one or more branch prediction streams from an instruction cache and stores associated instructions in an L0 cache. For example, the instructions modules 110 and 112 stores the instructions associated with the determined stream in the L0 cache 114.

At block 806, the system 100 stores the one or more branch prediction streams in a stream information table with an indication of the stored associated instructions. For example, the stream and path prediction module 116 updates the stream information table 120 with the determined streams such as shown in FIG. 4A with an indication, such as a pointer to the associated instructions in the L0 cache 114.

Figure 9:
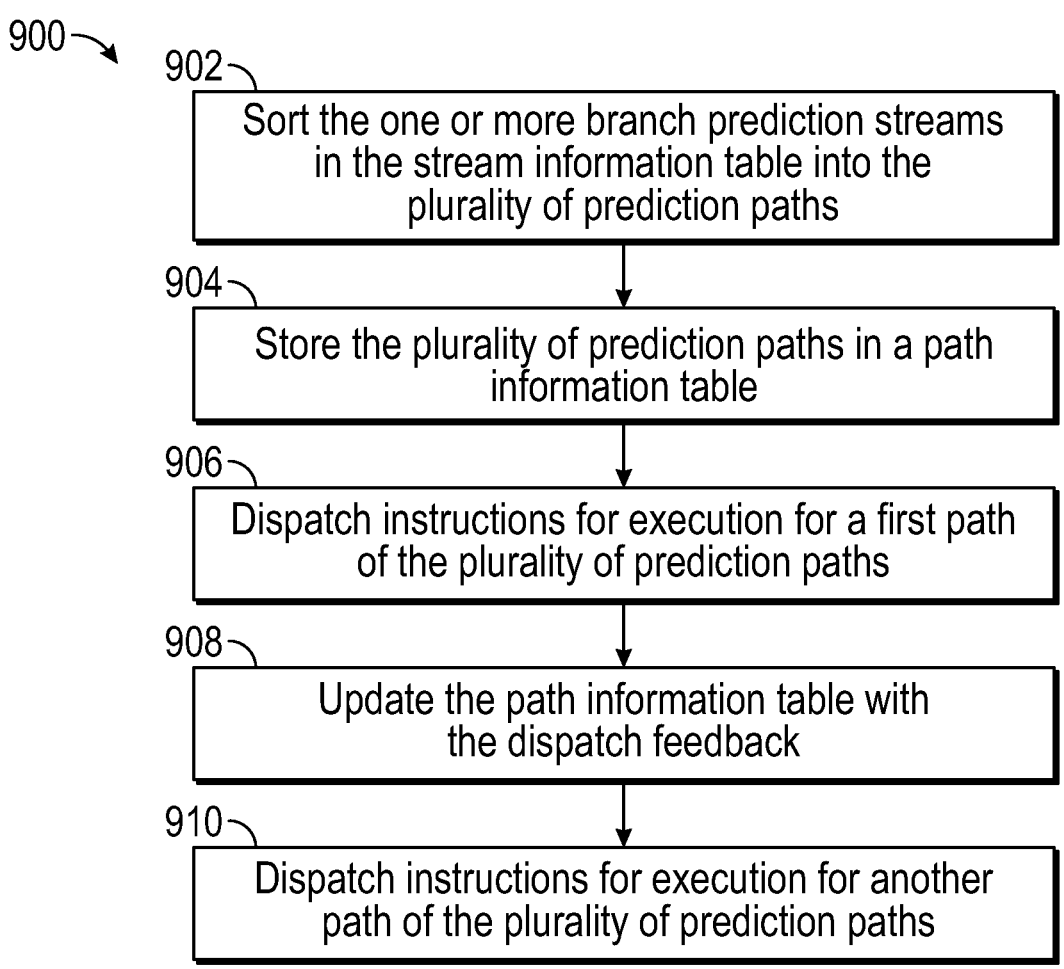
FIG. 9 is method for executing a plurality of prediction paths, according to one embodiment described herein.

FIG. 9 is method for executing a plurality of prediction paths, according to one embodiment described herein. Method 900 begins at block 902 where the system 100, including the stream and path prediction module 116 sorts the one or more branch prediction streams in the stream information table into the plurality of prediction paths, wherein each branch prediction stream is associated with at least on prediction path.

At block 904, the system 100 stores the plurality of prediction paths in a path information table such as the path information table 450. For example, as shown in FIG. 4B, stream and path prediction module 116 stores the determined paths with pointers to the associated streams for each path.

At block 906, the system 100 dispatches instructions for execution for a first path of the plurality of prediction paths. For example, the dispatch module 122 dispatches the path 303 as shown in FIGS. 5A and 5B. In some examples, the dispatch module tracks the logical resource dependencies of the dispatched instructions using a stream mask, and assigns the stream mask to the instructions such as described in relation to FIGS. 4B and 5A-B.

At block 908, the system 100 updates the path information table with the dispatch feedback, for example, as shown in FIGS. 5A and 5B, the dispatch feedback includes the issued instruction for the processing resources, available remaining resources, etc.

At block 910, the system 100 dispatches instructions for execution for another path of the plurality of prediction paths. For example, as shown in FIG. 5A, the dispatch module 122 dispatches the path 302 for execution. In another example, such as shown in FIG. 5B the dispatch module 122 dispatches the path 302 OoO.

Referring back to FIG. 1, which depicts a system flow diagram, according to one embodiment. As shown in FIG. 1, the system 100 may be embodied as a computer configured to execute the various functions of the system 100 described herein. The components of the system 100 may include, but are not limited to, one or more processors (or processing units), a system memory, a storage system, network interface connecting the system 100 to a network and, and a bus that couples various system components including the system memory and storage system to processors along with various input/output components. In other embodiments, system 100 is distributed and includes a plurality of discrete computing devices that are connected through wired or wireless networking. In some examples, system 100 may be embodied on a cloud implementation.

A bus in system 100 may include one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System 100 typically includes a variety of computer system readable media. Such media may be any available media that is accessible by system 100, and it includes both volatile and non-volatile media, removable and non-removable media.

System memory of system 100 can include computer system readable media in the form of volatile memory, such as random access memory (RAM) and/or cache memory. System 100 may further include other removable/non-removable, volatile/non-volatile computer system storage media. By way of example, the storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to the bus by one or more data media interfaces. As will be further depicted and described below, the system 100 memory may also include at least one program product having a set (e.g., at least one) of program modules that are configured to carry out the functions of various embodiments described herein.

System 100 may further include other removable/non-removable, volatile/non-volatile computer system storage media. In some examples, the storage system may be included as part of memory and may typically provide a non-volatile memory for the networked computing devices, and may include one or more different storage elements such as Flash memory, a hard disk drive, a solid state drive, an optical storage device, and/or a magnetic storage device. For example, the storage can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to a bus by one or more data media interfaces.

The system 100 memory may include a plurality of modules for performing various functions described herein. The modules generally include program code that is executable by one or more of the processors.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the stream and path prediction module 116) or related data available in the cloud. For example, the system 100 could execute on a computing system in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   during an execution of an instruction set, detecting, one or more instruction branches for the instruction set;
   determining an instruction branch of the one or more instruction branches is a hard to predict branch;
   determining a plurality of instruction sets for the hard to predict branch by
      fetching one or more branch prediction streams from an instruction cache and storing associated instructions in an L0 cache for each of the one or more branch prediction streams; and
      storing an entry for each of the one or more branch prediction streams in a stream information table, wherein each entry comprises an indication of the stored associated instructions associated with the branch prediction stream of the entry;
   determining a plurality of prediction paths for the determined plurality of instruction sets by sorting the entries for the one or more branch prediction streams in the stream information table into the plurality of prediction paths such that each entry is associated with at least one prediction path; and
   executing, in parallel, the plurality of prediction paths for the hard to predict branch.

2. The method of claim 1, further comprising:
   determining that one of the plurality of prediction paths is a correctly predicted path of the hard to predict branch;
   assigning the correctly predicted path as a main branch for execution; and
   flushing a remainder of the plurality of prediction paths.

3. The method of claim 1, wherein each instruction branch of the one or more instruction branches comprises an associated confidence score wherein the method further comprises:
   for a first associated confidence score, prefetching instructions for a second plurality of prediction paths; and
   for a second associated confidence score, fetching instructions and storing instructions for a third plurality of prediction paths; and
   wherein for a third associated confidence score, wherein the third associated confidence score indicates the instruction branch is a hard to predict branch, executing the plurality of prediction paths comprises:
      fetching and executing instructions for one of the plurality of prediction paths.

4. The method of claim 1, wherein determining the plurality of prediction paths for the determined plurality of instruction sets comprises:
   storing the plurality of prediction paths in a path information table, wherein the path information table further comprises dispatch feedback.

5. The method of claim 4, wherein executing the plurality of prediction paths for the hard to predict branch comprises:
   dispatching instructions for execution for a first path of the plurality of prediction paths, wherein the dispatched instructions are tracked using a stream mask;
   updating an allocation of resources and a dependency tracking field associated with the first path in a path information table; and dispatching instructions for execution for another path of the plurality of prediction paths.

6. The method of claim 1, wherein executing the plurality of prediction paths for the hard to predict branch comprises:
dispatching instructions for the plurality of prediction paths, wherein instructions within a path are dispatched in order and wherein the plurality of prediction paths are dispatched out of order.

7. A system comprising:
one or more computer processors; and
a memory containing a program which when executed by the one or more computer processors performs an operation comprising:
during an execution of an instruction set, detecting, one or more instruction branches for the instruction set;
determining an instruction branch of the one or more instruction branches is a hard to predict branch;
determining a plurality of instruction sets for the hard to predict branch by:
fetching one or more branch prediction streams from an instruction cache and storing associated instructions in an L0 cache for each of the one or more branch prediction streams; and
storing an entry for each of the one or more branch prediction streams in a stream information table, wherein each entry comprises an indication of the stored associated instructions associated with the branch prediction stream of the entry;
determining a plurality of prediction paths for the determined plurality of instruction sets by sorting the entries for the one or more branch prediction streams in the stream information table into the plurality of prediction paths such that each entry is associated with at least one prediction path; and
executing, in parallel, the plurality of prediction paths for the hard to predict branch.

8. The system of claim 7, wherein the operation further comprises:
determining that one of the plurality of prediction paths is a correctly predicted path of the hard to predict branch;
assigning the correctly predicted path as a main branch for execution; and
flushing a remainder of the plurality of prediction paths.

9. The system of claim 7, wherein each instruction branch of the one or more instruction branches comprises an associated confidence score wherein the operation further comprises:
for a first associated confidence score, prefetching instructions for a second plurality of prediction paths;
for a second associated confidence score, fetching instructions and storing instructions for a third plurality of prediction paths; and
wherein for a third associated confidence score, wherein the third associated confidence score indicates the instruction branch is a hard to predict branch, executing the plurality of prediction paths comprises:
fetching and executing instructions for the plurality of prediction paths.

10. The system of claim 7, wherein determining the plurality of prediction paths for the determined plurality of instruction sets comprises:
storing the plurality of prediction paths in a path information table, wherein the path information table further comprises dispatch feedback.

11. The system of claim 10, wherein executing the plurality of prediction paths for the hard to predict branch comprises:
dispatching instructions for execution for a first path of the plurality of prediction paths, wherein the dispatched instructions are tracked by a processor of the one or more computer processors using a stream mask;
updating an allocation of resources and a dependency tracking field associated with the first path in the path information table; and
dispatching instructions for execution for another path of the plurality of prediction paths.

12. The system of claim 7, wherein executing the plurality of prediction paths for the hard to predict branch comprises:
dispatching instructions for the plurality of prediction paths, wherein instructions within a path are dispatched in order and wherein the plurality of prediction paths are dispatched out of order.

13. A computer program product comprising:
a computer-readable storage medium having computer-readable program code embodied therewith, the computer-readable program code executable by one or more computer processors to perform an operation, the operation comprising:
during an execution of an instruction set, detecting, one or more instruction branches for the instruction set;
determining an instruction branch of the one or more instruction branches is a hard to predict branch;
determining a plurality of instruction sets for the hard to predict branch by:
fetching one or more branch prediction streams from an instruction cache and storing associated instructions in an L0 cache for each of the one or more branch prediction streams; and
storing an entry for each of the one or more branch prediction streams in a stream information table, wherein each entry comprises an indication of the stored associated instructions associated with the branch prediction stream of the entry;
determining a plurality of prediction paths for the determined plurality of instruction sets by sorting the entries for the one or more branch prediction streams in the stream information table into the plurality of prediction paths such that each entry is associated with at least one prediction path; and
executing, in parallel, the plurality of prediction paths for the hard to predict branch.

14. The computer program product of claim 13, wherein the operation further comprises:
determining that one of the plurality of prediction paths is a correctly predicted path of the hard to predict branch;
assigning the correctly predicted path as a main branch for execution; and
flushing a remainder of the plurality of prediction paths.

15. The computer program product of claim 13, wherein instruction branch of the one or more instruction branches comprises an associated confidence score wherein the operation further comprises:
for a first associated confidence score, prefetching instructions for a second plurality of prediction paths;
for a second associated confidence score, fetching instructions and storing instructions for a third plurality of prediction paths; and
wherein for a third associated confidence score, wherein the third associated confidence score indicates the instruction branch is a hard to predict branch, executing the plurality of prediction paths comprises:
fetching and executing instructions for the plurality of prediction paths.

16. The computer program product of claim 13, wherein determining the plurality of prediction paths for the determined plurality of instruction sets comprises:
- storing the plurality of prediction paths in a path information table, wherein the path information table further comprises dispatch feedback.

17. The computer program product of claim 16, wherein executing the plurality of prediction paths for the hard to predict branch comprises:
- dispatching instructions for execution for a first path of the plurality of prediction paths, wherein the dispatched instructions are dispatched in order, wherein the dispatched instructions are tracked using a stream mask;
- updating an allocation of resources and a dependency tracking field associated with the first path in the path information table; and
- dispatching instructions for execution for another path of the plurality of prediction paths, wherein the another path is an out of order path.

* * * * *